United States Patent [19]

Bernard

[11] 4,388,608

[45] Jun. 14, 1983

[54] VEHICLE LOCATION MONITORING SYSTEM

[76] Inventor: Patrice Bernard, 7, rue Fortuny, 75017 Paris, France

[21] Appl. No.: 241,299

[22] Filed: Mar. 6, 1981

[30] Foreign Application Priority Data

Mar. 6, 1980 [FR] France ............................ 80 05027

[51] Int. Cl.³ .......................... G08G 1/00; G08G 1/12
[52] U.S. Cl. ....................................... 340/24; 340/23; 364/450
[58] Field of Search .................... 340/24, 23; 364/450; 235/61 NV

[56] References Cited

U.S. PATENT DOCUMENTS

| | | | |
|---|---|---|---|
| 3,789,198 | 1/1974 | Henson et al. | 340/24 |
| 3,984,806 | 10/1976 | Tyler | 340/23 |
| 4,061,995 | 12/1977 | McCrickerd | 340/24 |
| 4,084,241 | 4/1978 | Tsumura | 340/24 |
| 4,114,437 | 9/1978 | Krogmann | 364/450 |
| 4,139,889 | 2/1979 | Ingels | 340/24 |
| 4,192,002 | 3/1980 | Draper | 340/24 |

FOREIGN PATENT DOCUMENTS 2274094 2/1976 France .
2420142 12/1979 France .

*Primary Examiner*—Glen R. Swann, III
*Attorney, Agent, or Firm*—Sughrue, Mion, Zinn, Macpeak and Seas

[57] ABSTRACT

The system comprises two parts: a first part which operates on a dead-reckoning basis from measurements of, say, measured wheel rotations (CD,CG) and a knowledge of an initial starting point and heading; and a second part which applies corrections to the first. The second part operates on the basis of a simplified map of the area travelled by the vehicle, said map storing only representations of "forbidden" areas (DZI) where the vehicle cannot possibly go, e.g. parks, lakes, large blocks of buildings etc. . . . A judicious selection of forbidden areas can be stored in highly stylized (i.e. simplified) form and still provide adequate information to overcome the inaccuracies inherent to any dead-reckoning system. This requires far less accurate storage for the secondary system than would a map of areas where the vehicle can go. A processor (OC) performs the required calculations and a display (PCV) is optionally provided for the driver, since in some systems, e.g. fleets of police cars, the point of the system is not to tell the driver where he is, but to tell a central control station.

13 Claims, 9 Drawing Figures

VEHICLE LOCATION MONITORING SYSTEM

FIELD OF THE INVENTION

This invention relates to the field of vehicle location monitoring systems.

STATE OF THE ART

There are several known approaches to locating a vehicle. These can be broadly grouped into four classes.

The first approach resorts to triangulation. The area travelled over by the vehicle is covered by a limited number of beacons. Either these beacons transmit signals which are received then compared by the vehicle or a signal is broadcast by the vehicle and picked up by the beacons. In either case, the physical location of the beacons must be known and the actual location of the vehicle is derived from a comparison of some physical characteristic of the received signals. Satellite systems also fall within this approach, since although the beacons (the satellites) are moving, their orbits are known with great precision.

The second approach resorts to proximity detection. The area travelled over by the vehicle is covered by a dense network of beacons, each one with limited coverage, either in range or in angular sector. The actual location of the vehicle is derived from the knowledge of which beacons are within radioelectric range of the vehicle.

The third approach resorts to dead reckoning. No ground facilities are required. Instead, the vehicle's current location is derived from a knowledge of its initial location and heading supplemented by integration over distance or time of suitable information about its course. An example of this approach is inertial navigation as used by certain ships and aircraft.

A fourth approach stems from a knowledge of constraints placed on the places which can be occupied by the vehicle, this approach removes a degree of uncertainty about where the vehicle is actually located as derived from some physical measurement made on the vehicle itself, such as distance travelled.

A typical representative of the fourth approach is a system used for monitoring the location of urban transit buses. Given the line or route number and the distance travelled since leaving the terminal, it is trivial to locate a bus. A number of systems have been proposed, which fall basically into this fourth "corridor" approach, while borrowing some elements from a crude dead reckoning mechanism. Of relevance are, in particular, a system described in U.S. Pat. No. 3,984,806 MARCONI and a system described in the U.S. Pat. No. 3,789,198 HENSON. In both of these systems, an exhaustive knowledge of all drivable surfaces is essential. In MARCONI, this description takes the form of a graph. Its nodes are junctions; its branches are segments of roads or streets between junctions. The branches are described by their length and the identity of the nodes which they link. The nodes are described by the identity of the branches that they terminate and by the relative angles between those branches. Knowing its initial position, a vehicle determines that it is approaching a junction when the distance travelled as indicated by its odometer is almost equal to the length of the current branch. It then makes a crude estimate of the variation of its heading to guess which new branch is being taken, and then relies on its odometer until it thinks that it has reached the next junction. In HENSON, the description of the corridors stored in the vehicle is more complete since a memory contains the coordinates of drivable surfaces; for example, a grid network is overlaid on a map of an area, each grid intersection is assigned a memory position, to which a value of 1 is given if the grid intersection coincides with a street, roadway or alleyway. The location monitoring system comprises a dead reckoning system, which outputs an estimated location, which is then corrected to the nearest drivable surface if the above-mentioned memory shows that the estimated location is not drivable.

The systems which have been proposed so far suffer from a number of drawbacks.

The drawbacks of the first approach are the following. It requires ground facilities, the high cost of which can hardly be justified for a small number of vehicles. It makes use of radio channels. If the bandwidth is large, this requires a large amount spectrum, which is a scarce commodity. On the other hand if the bandwidth is narrow, this results in poor location accuracy. If the signals are transmitted by fixed beacons and received by the vehicles, the vehicles must be equipped with fairly elaborate measurement apparatus and computing power. On the other hand if the signals are transmitted by the vehicles and picked up by the fixed beacons, channel congestion can only be avoided through a limitation either on the number of vehicles which can be monitored by the system or on the frequency with which the location of each vehicle can be monitored. The narrower the channel, the tighter the limitation.

The drawbacks of the second approach are the following. It requires the building of an extensive grid of beacons, not to mention the network which may be required to connect them to a monitoring station. The location accuracy may vary, due among other reasons to multi-path propagation, which is a common phenomenon in urban areas. Of course, the beacon range can be limited, for instance through burying inductive loops into the causeway, but then the cost is even higher. Or one can use highly directive radioelectric or optical beams, but then a vehicle can be masked by other vehicles.

The drawbacks of the third approach are the following. Errors made in the measurement of physical parameters are usually cumulative, so that the location accuracy drops sharply with time or with distance covered. Some military equipment uses highly complex and costly apparatus to mitigate the problem of cumulative errors but, even then, other forms of localisation system are required from time to time to obtain an accurate "fix".

The drawbacks of the fourth approach are the following. Either it is used by vehicles with limited freedom of action, e.g. busses (so long as there are no traffic diversions), or else an exhaustive description (e.g. of an entire city street plan) is required which constitutes a technical or economical obstacle to practical implementation.

Preferred embodiments of the present invention provide a vehicle location monitoring system of high accuracy and low cost, and that does not require any ground facility nor radioelectric means and that does not place any rigid constraints on the permissible paths followed by a vehicle.

SUMMARY OF THE INVENTION

The present invention provides a vehicle location monitoring system consisting of a primary system and a secondary system. The primary system updates an estimated location from an initial known position and heading by integrating elementary motions, as determined by measurement apparatus carried by the vehicle. The secondary system corrects the estimated location and, if need be, the estimated heading and any other parameter which may be used in the process (e.g. tire circumference). The secondary system performs its corrections on the basis of a knowledge of areas where the vehicle cannot be located and which consequently can only figure in the estimated position as a result of the accumulated dead reckoning errors of the primary system. Unlike known localisation systems based on a knowledge of all drivable areas, the use of "forbidden" areas for the sole purpose of correcting a primary system makes it possible to use a subset only of those areas where the vehicle cannot actually be as "forbidden" areas and even to use a stylized representation of those areas such as, for instance, a circle representing a block. The representation of the "forbidden" areas may be graphical or digital.

BRIEF DESCRIPTION OF THE DRAWINGS

The invention will be better understood with the following description of a preferred embodiment with reference to the accompanying drawings. This description is solely intended to help understand the invention and the invention is not limited to the preferred embodiment. In the accompanying drawings.

DESCRIPTION OF PREFERRED EMBODIMENT

The location monitoring system comprises a processor OC, two wheel sensors CG and CD from which the angular positions of the left rear wheel and of the right rear wheel of the vehicle can be derived and a forbidden areas descriptor DZI. The system is also provided, for the driver's convenience, with a display and control panel PCV.

Figure 1:
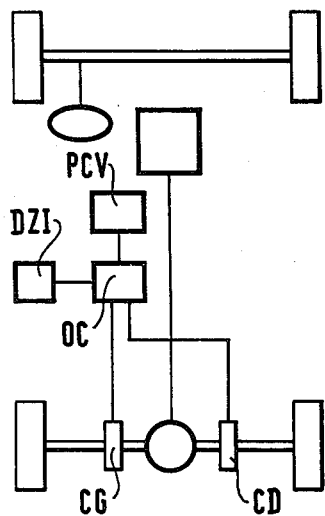
FIG. 1 is a block diagram of a location monitoring system in accordance with the invention and a possible layout of its constitutive parts on a vehicle on which it is installed.
Figure 2:
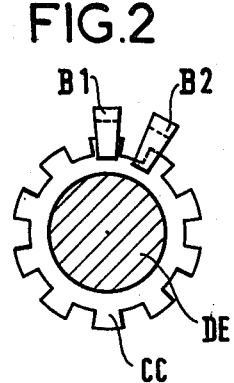
FIGS. 2 and 3 are two orthogonal schematic views of a possible implementation of a sensor and its installation on a half-axle.
Figure 3:
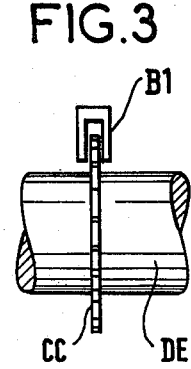

Each of the two wheel sensors CG and CD is arranged in the following way (FIGS. 2 and 3). A toothed disk is rigged to a half-axle DE connecting the differential to a wheel. The disk is divided into angular sectors distinguished by slots and teeth. One slot and one adjacent tooth comprise what will be referred to as one step of the toothed disk CC. Two optical switches B1 and B2 are each made of a light-emitting diode (LED) and a phototransistor. They are set up in such a way that the teeth of the disk intercept the beam but the slots do not. The angular off-set between the optical switches is $(n+\frac{1}{2})$ times one half-step.

Figure 4:
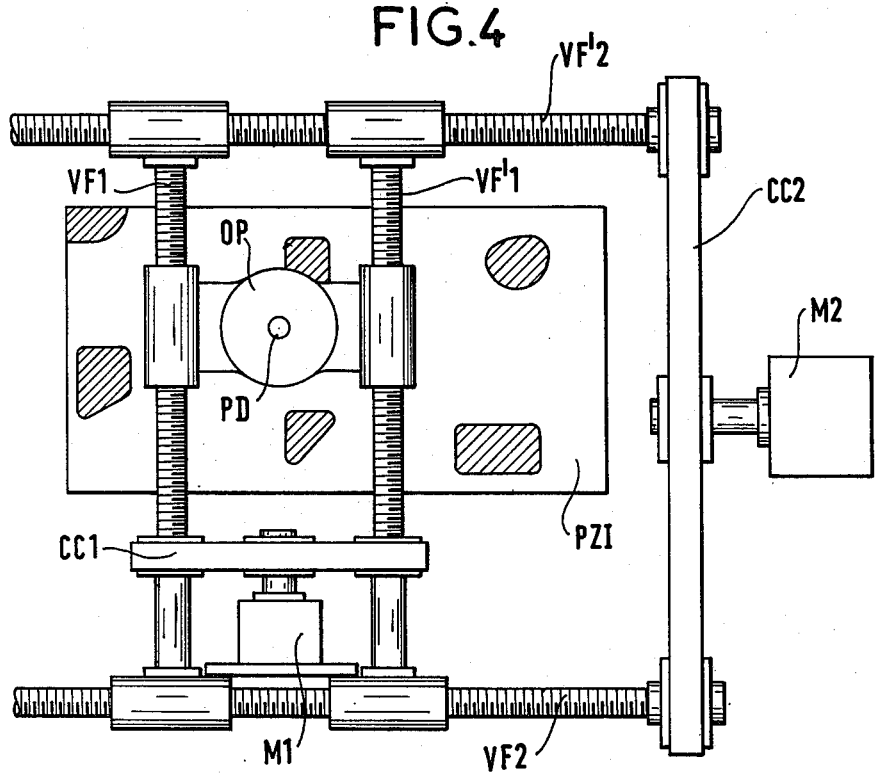
FIG. 4 is a plan view of a first implementation of the forbidden areas descriptor.

The forbidden areas descriptor DZI (FIG. 4) comprises a transparent film PZI with opaque areas corresponding to a graphical, stylized and non exhaustive representation of "forbidden" areas and a spot read-out device carried by an assembly which is movable relative to the film. The movable assembly is made in two parts. On one side of the film, it comprises a spot light source, e.g. an LED, the image of which is focused by a lens OP on a point of the film PZI. On the other side of the film it comprises a photodetector (not shown). The movable assembly further comprises two trays which move in perpendicular directions. The first tray carries the spot read-out device and moves in one direction along two lead-screws VF1 and VF'1 rotated by a toothed belt CC1 driven by a stepper motor M1.

The second tray carries the first tray together with its drive and itself moves in a perpendicular direction along two lead-screws VF2 and VF'2 rotated by a stepper motor M2.

By properly energizing the motors M1 and M2, the spot read-out device can be brought above that point of the film which corresponds to the estimated vehicular location. By detecting whether this point is opaque or transparent, the spot read out device can indicate whether the estimated position is within a forbidden area or not.

The opaque areas of the film PZI correspond to a non-exhaustive stylized representation of forbidden areas, that is to say that they do not correspond to all those areas where the vehicle cannot actually be located but to only some of them. In addition, these selected areas are not represented with their actual shape but with a simplified outline. The opaque parts may correspond, for example, to geometrical figures inscribed within some only of the blocks of a city, (e.g. the larger blocks, or parks, or sea etc)

The display and control panel PCV comprises the following items (FIG. 5): a light source S projects the image of a portion of an area map PZ through a lens O and, optionally, via a rotating prism PT onto a mirror, not shown, which reflects it onto a screen E, (FIG. 6) facing the driver of the vehicle. Next to this screen, a number of switches and indicator lamps serve to provide communication between the driver and the localising system.

The area map PZ is moved with respect to the lens system under the control of two stepper motors M3 and M4 which, via toothed belts CC3 and CC4, rotate lead screws VF3,VF'3 and VF4,VF'4, thus moving the tray to which the map PZ is fixed. The area map PZ may contain several pictures of the same area, which differ in scale and the amount of detail shown. Scale switching is performed under the control of keys (O,O); the area map then moves in such a way that the image remains centered on the same geographical point.

The optional rotating prism PT allows for a rotation of the map image so that the heading of the vehicle remains unchanged with respect to the screen, e.g. the vehicle is always represented as heading towards the top of the image.

Alternatively, if there is no rotating prism PT, or if it has been disabled under manual control, the image may be oriented with North at its top.

The control and display panel may be equipped with a heading indicator, not shown here. This indicator consists of a number of LEDs whose image is overlaid on the screen by means of a lens system and, possibly using a mirror. This indicator may be used to display the heading of the vehicle. If the processing unit of the location monitoring system is provided with a program to determine a critical path, the indicator may also be used to display the route to be followed or, if the scale is not adequate, a part of that route.

I will now give a more detailed description of the operation of the location monitoring system.

The optical switches B1 and B2 associated with a slotted disk CC (FIGS. 2 and 3) indicate the angular position accurate to within ⅛ of the size of the disk. This is because, when the slotted disk CC rotates through an angle that is equal to one step, optical switches B1 and B2 each go through one complete cycle between open and close and close and open, but at positions of the slotted disk CC which are not the same since optical switches B1 and B2 are off-set by an odd number of quarter steps. The illumination of the photodetectors of the optical switches B1 and B2 thus enables to define four states, all four of which are gone through by the outputs of optical switches B1 and B2 when the slotted disk CC rotates through one step. The order of the transitions between these four states indicates the direction of rotation since each one of these states corresponds to an angle of ¼ step, the angular position of the slotted disk CC is therefore known to within about ⅛ step. Thus, for a disk with sixty four slots, the shaft position is known to within 1/512th of a turn.

Knowing the diameter of the tyres, one can associate a distance run with each angular motion of ¼ of a step. The processing unit OC can then sum these incremental distances and thus give the distance travelled by the left wheel, by the right wheel and, if so desired, by the differential.

The heading of the vehicle can be derived from a measurement of the difference between the angular positions of the left and right wheels, by multiplying said difference by the ratio of the tyre radius divided by the track of the back wheels.

Counting the slots of the left and right disk gives a coarse estimate of the difference between the angular positions of the wheels, accurate to within ¼ of a step. A time base makes it possible to refine on this measurement, hence on the knowledge of the heading, as soon as the vehicle is moving at not too slow a speed. An example will help understand this point. Assume that, for the initial heading the optical switch B1 of the left wheel and the optical switch B1 of the right wheel turn on and off simultaneously. Further, assume that the vehicle comes slightly to its right and then follows a steady course. While the vehicle is turning, the left wheel is rotating slightly faster than the right wheel. When the heading bcomes steady, so does the angular difference. The transitions of the optical switch B1 of the left wheel will now occur slightly ahead of time with respect to those of its right wheel counterpart. The ratio between the period of time when one of the optical switches is on and the other is off to the duration of one step, that is to the time elapsed between two successive on-off transitions of the same switch, indicates by what fraction of one step the left wheel is now ahead of the right wheel FIGS. 7 and 8 show an embodiment of a circuit for performing this calculation.

Figure 7:
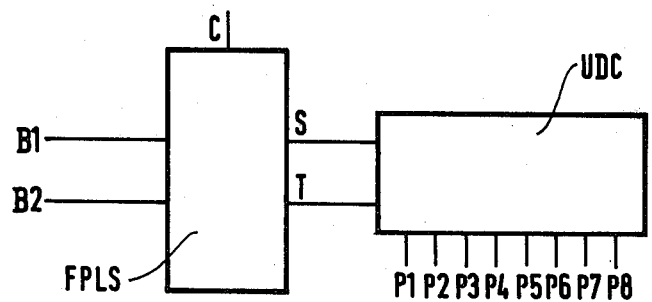
FIG. 7 is a block diagram of a circuit that yields a coarse value of the angular difference between two wheels, based on the indications of wheel sensors.

FIG. 7 is a block diagram of a circuit for determining the angular position to within ⅛ of a step. In the figure, FPLS designates a programmable logic sequencer such as Signetics TM type 82 S 105. It takes output signals from the optical switches B1 & B2 as input transitions. It has eight internal states corresponding to quarter steps, each quarter step comprising a transient state which only lasts for the duration of one clock period applied to the sequencer, and a stable state which lasts until the next transition in the signals from B1 & B2. S and T comprise two outputs from the sequencer FPLS. The output S indicates the direction of rotation, while the output T is a "pip". that marks the duration of the transient state. The outputs S & T are connected to respective inputs of an up/down counter UDC whose outputs indicate the angular position in ¼ steps.

Figure 8:
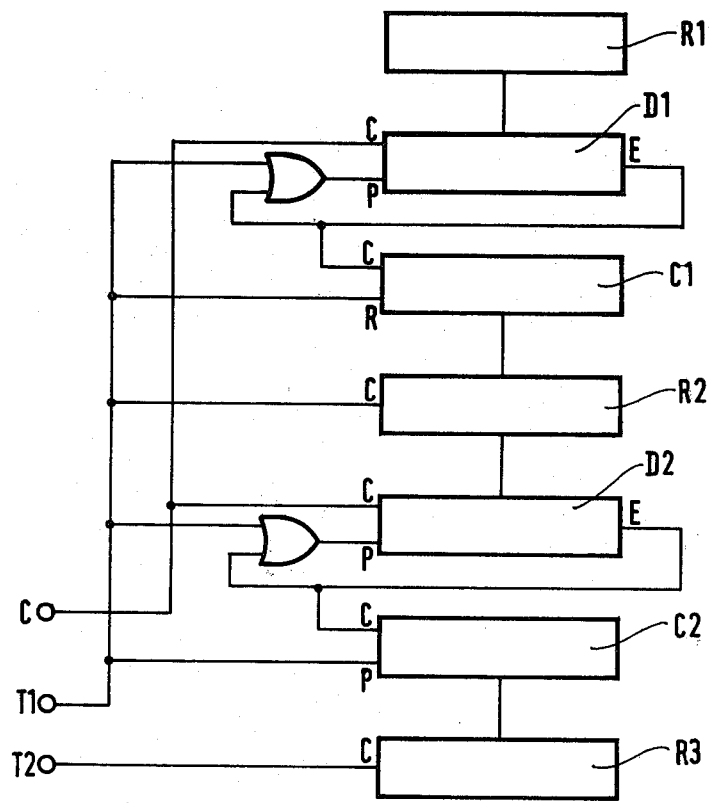
FIG. 8 is a block diagram of a circuit that improves the accuracy of the measurement of the FIG. 7 circuit.

FIG. 8 is a block diagram of a circuit for estimating the amount by which one wheel has shifted relative to the other, on the basis of pulses T1 & T2 derived from two optical switches, each associated with a corresponding one of the wheels.

In the figure, D1 represents a count down circuit which is initialised on the appearance of a pulse T1 to a value contained in a register R1. The count down circuit D1 is re-initialised each time its count reaches zero, such that together with the register R1 it constitutes a circuit for dividing a series of clock pulse at its clock input C by the number stored in the register. The divided output pulse train appears at its output E and is applied to the clock input of a counter C1. The counter C1 is reset to zero by each pulse T1, which also has the effect of loading a register R2 with the value present in the counter C1 immediately before it is reset. A second down counter D2 and up counter C2 are arranged with respect to the register R2 in substantially the same way as the first down counter D1 and up counter C1 are arranged with respect to the register R1. The counter C2 counts at the rate of said clock pulses C, but divided by the value contained in the register R2. The count reached by the counter C2 on the appearance of pulse T2 is loaded into a register R3 by said pulse T2.

The count loaded into the register R3 is representative of the ratio between the time elapsed between two transitions on two different wheels and the time elapsed between two transitions on the same wheel. The first-mentioned time defines the counting interval, while the counting frequency is inversely proportional to the second-mentioned time. The scale is such that when these times are equal, the value contained in R3 is equal to that in R1 (to within one counter step). It is convenient for this value to be a power of 2, but it may be adjusted to take account of inequalities in tooth sizes for example.

Thus, by virtue of the circuit shown in FIG. 7, optionally supplemented by the circuit of FIG. 8 to improve accuracy, the processor OC is provided with means for detecting the distance run and the heading. It obtains this information by observing the up/down counter UDC and the register R3, either continuously, or in response to an interrupt derived from the up/down counter UDC, e.g. once per turn of the wheel.

The processing unit OC is thus able to compute the distance travelled and variations in heading. If it if fed with the initial location and heading, an integration program will give the estimated location. The processing unit OC can accordingly move the movable assembly of the forbidden area detector DZI.

It may happen that the photodetector PD of the assembly DZI detects one of the forbidden areas. This may result from poor accuracy in measurement or in computation, from the vehicle skidding, from side winds, from a badly cambered road, or perhaps from an incorrect value for one of the parameters which describe the vehicle, such as the tire circumference.

In this case, a correction program will be called upon. The estimated location is moved perpendicularly to the heading by an amount equal to the unit length used in the dead reckoning program, typically corresponding to one revolution of a wheel. The direction of the correction is obtained from the direction in which the photodetector PD must be moved to keep it out of the forbidden area (because the motors used are of the stepper variety, the actual motion of photodetector may be only roughly perpendicular to the heading).

The location correction which has been just described is not the only correction performed by the processing unit. The estimated heading is also corrected, by a very small amount, in the same left or right direction as the location correction. In addition, the heading corrections are accumulated over a certain distance. If this accumulated value exceeds a preset threshold, this may point to a poor knowledge of the relative pressure or wear of the left and right tires. Consequently, the processing unit will increment or decrement the value by a very small constant which it adds to the estimated heading say for each revolution of a wheel.

Moreover, although the preceding correction may compensate for a difference in pressure or wear, it may happen that, because the value used for the diameters of both types is either too large or too small, due, for instance, to wear or to pressure variation, the estimated course still collides with a forbidden area. Such a situation may arise shortly after a turn coming after a long straight line. The processing unit still makes a correction to the value used for the tire diameters. To this end, it logs the estimated location, say every mile travelled. When performing a location correction, the processing unit multiplies this correction by the cosine of its angle with the recent average course. If the sum of such values exceeds some threshold, say 50 feet for 10 miles travelled, the processing unit will slightly modify the value used as the tire diameters.

In another embodiment of the forbidden area descriptor DZI these areas are represented in a memory, for example as circles inscribed in blocks or fields which are defined by their radii and the coordinates of their centers. Should the estimated course cross into such a circle, a correction is performed, perpendicular to the heading and toward the outside of the circle, as determined from the angle between the heading and the vector linking the location to the center of the circle.

The location first estimated from the dead reckoning system which integrates data acquired from the position of the wheels, then corrected as discussed from possible infringements of forbidden areas, is the current location of the vehicle.

Figure 5:
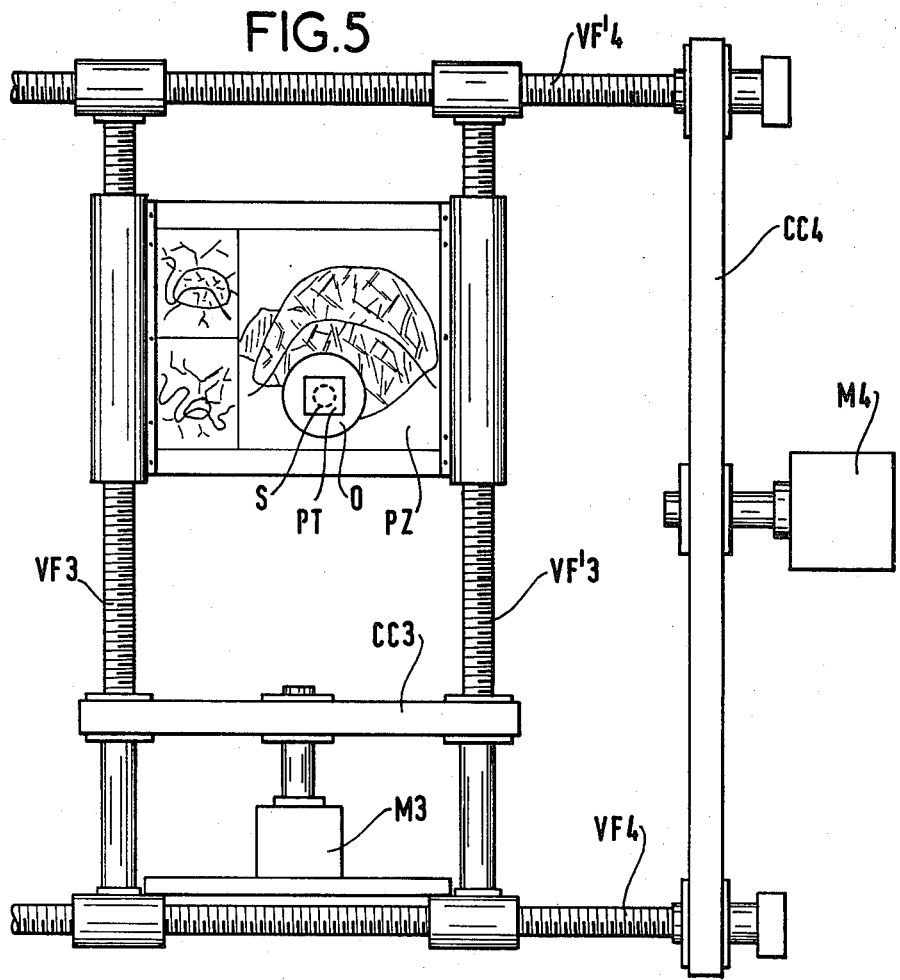
FIGS. 5 and 6 are two orthogonal views of a possible implementation of a display and control panel.
Figure 6:
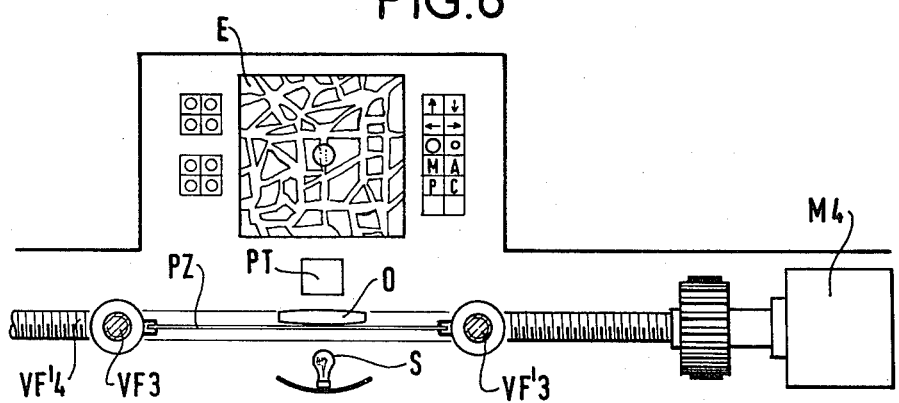

There are several applications to which a knowledge of a vehicle's position to the accuracy provided by the present system (a few meters) can be applied. One particular application is indicating a recommended route to reach a chosen destination. For this purpose, the display and control panel PCV is provided with keys for moving over the map a marker that normally indicates the position of the vehicle. It also includes a key for indicating that the position of the marker on the map is the desired destination. To make this destination indicating operation quicker and easier, the area through which the vehicle is moving can be displayed on the map PZ several times at different scales showing different degrees of detail, as can be seen in FIG. 5. Further keys (O,o) on the display and control panel PCV are used to switch scales, with the processor making sure that the marker continues to designate the same geographical location at each scale, or else refusing to change scale if the location is not available on a map at the chosen scale.

The display and control panel PCV also includes means (not shown in FIG. 5) for indicating a recommended route. These means comprise a set of LEDs in a lens system for superposing the image of the LEDs on the screen E, together with means for selectively lighting the LEDs so that the image of the lighted diodes on the map corresponds to the chosen route.

The processor OC is additionally provided with a digital memory storing the co-ordinates of a directed graph which represents a selection of node points in the area through which the vehicle travels, together with weighting factors associated with the branches between nodes to give an estimate of the time needed to run along them. To determine which route to recommend, the processor OC uses a shortest path search algorithm in three parts. The first part consists in estimating the time required for the vehicle to travel from its present location to the immediately surrounding nodes, as though there existed direct arteries for it to follow. The second part uses the same procedure to estimate the time required to reach the target point starting from its immediately surrounding nodes, again assuming that there exist direct arteries to follow. The third part comprises an algorithm for critical path analysis of the kind conventional to operations research (e.g. the Dantzig or the Ford-Fulkerson algorithm) to find the best path through the selection of stored node points.

Different weighting factors may be associated with each branch between nodes, corresponding to different traffic conditions for example, and the appropriate factor would then be chosen as a function of traffic conditions. Alternatively, the memory may be a read/write memory, to enable the weighting factors to be up-dated from periodic broadcasts from a control center.

The control center can up-date its own store of weighting factors from any conventional network of traffic detector means, e.g. vehicle counters, but advantageously it will include means for up-dating the store on the basis of radioed reports from a fleet of vehicles. If the vehicles are equipped with the same route-recommending system, this up-dating can proceed automatically.

Thus each vehicle is capable of: identifying the node points of the graph near to its current location; of noting the times at which it passes through or at least close to, each node point; of determining whether it is, in fact, following a path corresponding to stored branch; and finally, if it is following such a branch, of noting the time taken to travel along it. The vehicle is thus capable of determining up-to-date branch travel time data. This data can be relayed to the control center on request or as soon as it becomes available. The request may have the form: "will all vehicles located within one mile of the following node point report the most recent branch travelled and the time taken". The vehicles should reply in a predetermined order, e.g. as a function of their distance from the relevant node point. The request may alternatively be more restrictive, e.g. only requiring replies from vehicles that have a travel time which differs by more than 30% from the last broadcast travel time.

Another useful application of the location system consists in reconstituting the path travelled. This requires a suitable memory to be added to the processor OC for storing the co-ordinates of a selection of the points passed through, together with the times of passage if required. For example, a record could be kept every 100 yds of the vehicle position and the time. Alternatively, a more detailed record could be kept, but only of the last mile travelled. Data thus accumulated could be read out by radio in response to an appropriate request, or onto some form of removable medium such as a magnetic cassette, or simply directly onto the vehicle display, e.g. after the vehicle has come to rest.

A further useful application of the location system stems directly from its accuracy, and concerns locating vehicles without a driver, e.g. vehicles that have been hired and left wherever convenient by their previous user. The location system, together with a radio transmitter/receiver system makes it possible to locate the nearest free vehicle to a specified point. A table of street numbers and an interpolation program then make it possible to translate the given location into an address that can be told to a new user. That, together with information concerning make, color and registration number, should make it no problem to find the vehicle, since it will be within a number or two of the given address. For a hire system, there remains a requirement that the approved person and no one else should be able to drive away the vehicle.

This needs an identification system to be added to the location system. This could work in response to a suitable badge, or else by means of a code keyed-in by the user. The processor would then be able to verify that the new driver is indeed the driver announced to it over the radio.

Such a hire system could make good use of the above-mentioned system for reconstituting the path travelled for charging purposes. This could go as far as automatically debiting the charge from said badge, if of the credit card type.

Another useful application of the vehicle location system consists in selecting one from a plurality of vehicles to go to a particular scene. This applies particularly to police cars and taxis, but doubtless other vehicle fleets could also find it useful.

A control station interrogates the fleet of vehicles on the road by radio. The vehicles reply as a function of their respective locations. In practical terms, to avoid over-loading radio channel capacity, this should be arranged as a function of distance (in time or miles) from the specified scene.

Figure 9:
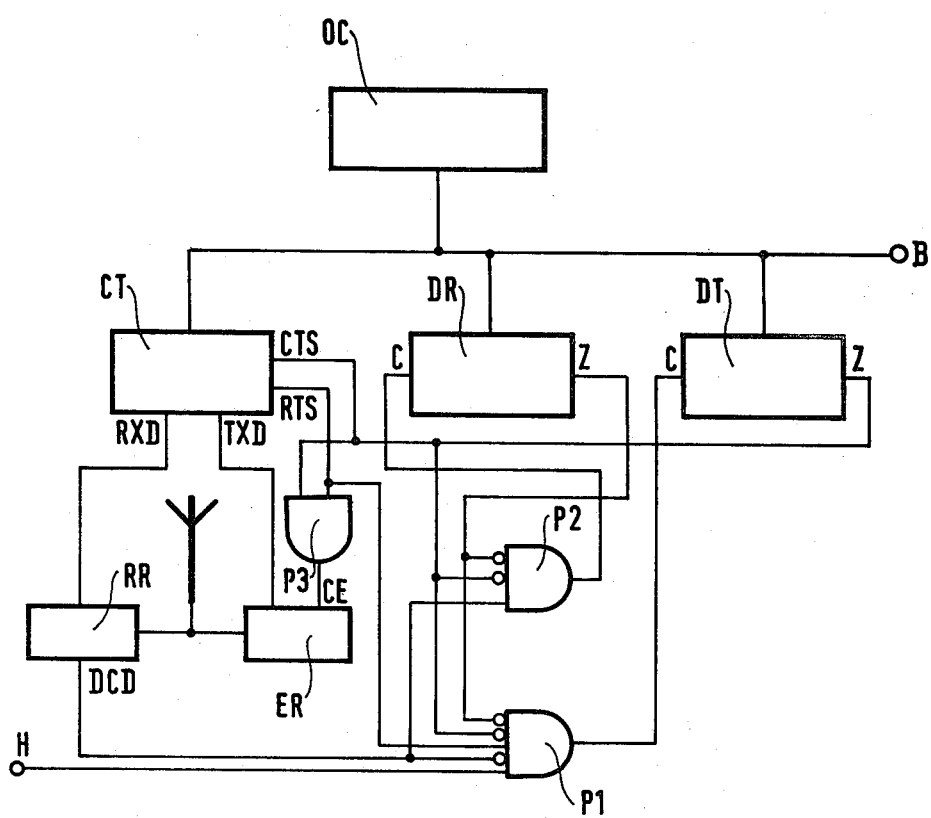
FIG. 9 is a block diagram of a path allocation system for a plurality of vehicles linked by radio connection to a central point, said path allocation system being based on a location monitoring system in accordance with the invention.

The above-mentioned applications of the vehicle location system can be achieved using the circuit shown in FIG. 9.

In the figure OC is the processor. It is connected by a bus B to a data transmission controller CT, an initializable reply counter DR, and time counter DT which is likewise intializable. A radio transmitter ER receives data to be transmitted TXD from the data transmission controller CT, and a send instruction via an input CE. A radio receiver RR supplies data it receives to the data transmission controller via an output RXD, and supplies an indication of carrier detection on an output DCD. The device also has three gates P1, P2 & P3.

The apparatus works as follows. When the processor wishes to reply to a received radio request, it initializes the transmission controller CT, it loads the reply counter DR with the maximum number of replies authorised by the station, and it loads the time counter DT with a calculated figure that is lower the greater the estimated value of its reply. By way of example, the factor could be proportional to the square of the distance of the vehicle from the point mentioned by the central station, with a constant of proportionality chosen as a function of the kind of broadcast request to which a reply is being made.

After initialization, the time counter counts down at a rate set by a clock signal H, omitting those periods of time for which the receiver RR indicates, via its output DCD, that the central station is still transmitting or that some other vehicle is replying. This count down continues for as long as the transmission controller indicates, via its output RTS, that it desires to send, and until the time counter DT or the reply counter DR counts down to zero. If the time counter DT is the first to reach zero while the signal on output RTS is still indicative of a desire to send, then the send signal is applied to the input CE of the transmitter ER via the gate P3, and to the controller via its input CTS.

Each reply from another vehicle that is received by the receiver RR causes the reply counter DR to count down one step, unless it has already reached zero, in which case the vehicle assumes that no reply is required from it since enough better-placed vehicles have already replied. In FIG. 9 this is achieved by the zero signal from the counter DR disabling the application of further clock signals H to the counters DR & DT by means of gates P1 & P2.

With operation as has just been described, it can be seen that all vehicles likely to reply to a given question start counting down together on the central station carrier being turned off. The vehicle that has the best estimate of the value of its reply, i.e. the vehicle that initialized its time counter DT with the lowest figure, is the first to reply. Transmission of its message inhibits the count down in all the other vehicles, unless there are two "first" vehicles that start transmitting at the same instant. In that case the central station will probably not be able to understand either message due to mutual interference, and the third best vehicle (perceived as the second best by the rest of the fleet) is the one that will be understood by the central station. So long as the geographical density of vehicles is uniform, and the figure stored in each time counter DC is proportional to the square of its distance from the focal point of the central station request, the probability of mutual interference by simultaneous vehicle replies depends only on the vehicle density and on the constant of proportionality (to which said probability is inversely proportional).

It should be noted that the system does not require identical bit rates to be transmitted by the central station and by the vehicles, nor does it require them to use the same kind of modulation.

The various applications that have been described of uses to which the location can be put are merely by way of illustration. The invention is not tied to any specific application.

I claim:

1. A system for monitoring the location of a vehicle, said system comprising on board said vehicle:
   primary system means for providing an estimated location of the vehicle from an initial known location and heading and from measuring subsequent travel of the vehicle; and
   secondary system means for correcting the estimated location of the vehicle as given by the primary system including means for comparing the estimated location with stored locations of "forbidden" areas where the vehicle cannot possibly be.

2. A system for monitoring the location of a vehicle according to claim 1, wherein the vehicle is a wheeled vehicle and the primary system means comprises means for monitoring wheel revolutions for measuring said subsequent travel of the vehicle, said monitoring means comprising means for sensing one of the revolutions of a left wheel, the revolutions of a right wheel, and a weighted sum of the revolutions of a left wheel and a right wheel for deriving a distance of travel, and means for determining a difference between the revolutions of a right wheel and a left wheel for deriving a heading of travel.

3. A system for monitoring the location of a vehicle according to claim 2, wherein said sensing means comprises a left disk and a right disk on which angular sectors have been marked and which rotate in connection with a respective left wheel and right wheel of the vehicle, left and right sensors, fixed to the body of the vehicle, each associated with a respective one of the disks, and responsive to the passing of the angular sectors defined on the disks, and wherein said difference determining means comprises means for determining a difference between the number of sectors of the right disk and the number of sectors of the left disk that have rotated past the sensors, and means for correcting said difference between said numbers of sectors in accordance with a ratio of the period of time elapsed between the time when one of the sensors detects a sector change and the time when the other sensor detects a sector change and the period of time elapsed between two successive sector change detections by one of said sensors.

4. A system for monitoring the location of a vehicle, according to claim 1, wherein the secondary system means further comprises:
   a map with a graphical, non-exhaustive stylized representation of said forbidden areas;
   a referencing device that determines which point of the map corresponds to the estimated location of the vehicle;
   an assembly that can be moved over the map; and
   a spot read-out device carried by the assembly for, when brought by the referencing device over the point of the map which corresponds to the estimated location of the vehicle, detecting whether said estimated location lies within one of said forbidden areas of said map.

5. A system for monitoring the location of a vehicle, according to claim 1, wherein the secondary system further comprises: a digital memory which stores coordinates and digital data that define the location and shape of said forbidden areas, and a processing unit for determining whether the estimated location of the vehicle lies within one of the forbidden areas stored in the digital memory.

6. A system for monitoring the location of a vehicle, according to claim 1, wherein said primary system means comprises means for producing intermediate values of an estimated location prior to delivering said estimated location to said secondary system, and wherein the secondary system means further comprises means for correcting said intermediate values.

7. A system for monitoring the location of a vehicle, according to claim 1, further comprising:
   a digital memory in which the coordinates of the nodes of a directed graph are stored said coordinates representing a selection of points of the area over which the vehicle travels together with weighting factors associated with the branches between nodes, said weighting factors being representative of the time required to travel along the respective branches;
   a processing unit for computing the shortest path between the estimated location of the vehicle as delivered by the primary system and adjusted by the secondary system and a location selected as destination point;
   means to enter the coordinates of the destination point into the processing unit; and
   a display device controlled by the processing unit to visualize the short term direction to be followed.

8. A system for monitoring the location of a vehicle, according to claim 7, wherein the display device includes means for indicating over a part of a map the estimated location of the vehicle and the suggested route.

9. A system for monitoring the location of a vehicle, according to claim 1, further including storage means into which data representative of the route travelled are logged in terms of the estimated location of the vehicle and time of the day for every 100 yds travelled.

10. A system for monitoring the location of a vehicle, according to claim 1, further including a radio transceiver and means, when polled, for transmitting the estimated location of the vehicle.

11. A dispatching system to enable a central station to dispatch at least one vehicle from a plurality of vehicles connected by radio to the central station, each vehicle being equipped with an on-board location monitoring system including a primary system for providing an estimated location of the vehicle from an initial known location and heading and from the subsequent travel of the vehicle, a secondary system that corrects the estimated location of the vehicle as given by the primary system including means for comparing the estimated location with stored locations of "forbidden" areas where the vehicle cannot possibly be, said dispatching system including an interrogating device at the central station to offer a run to every vehicle and, on board each vehicle, a transceiver to receive the offered run and a processing device that rates each proposed run on the basis of the estimated location of the vehicle as delivered by the location monitoring system, and wherein said dispatching system further includes polling means for causing the transceiver on each vehicle to respond to a run-offering call from the interrogating central station after a period of time the duration of which is based on the rating attributed to the offered run by the processing unit of the vehicle.

12. A dispatching system according to claim 11, further comprising means including a device carried abroad each vehicle for counting down said period of time and means for halting said counting down means while the transceiver of another vehicle is replying to said central station.

13. A dispatching system according to claim 12, further including a counter carried aboard each vehicle that inhibits the transceiver of the vehicle if it has not already replied once a given number of other transceivers have replied.

* * * * *